(12) United States Patent  
Henrichmöller et al.

(10) Patent No.: US 12,391,089 B2  
(45) Date of Patent: Aug. 19, 2025

(54) METHOD AND SYSTEM FOR AVOIDING OVERHEATING OF A VEHICLE SUBSYSTEM

(71) Applicant: Wuhan Lotus Cars Co., Ltd., Wuhan (CN)

(72) Inventors: Dirk Henrichmöller, Wiesbaden (DE); Boris Kirchner, Schönaich (DE)

(73) Assignee: WUHAN LOTUS CARS CO., LTD., Wuhan (CN)

( * ) Notice: Subject to any disclaimer, the term of this patent is extended or adjusted under 35 U.S.C. 154(b) by 69 days.

(21) Appl. No.: 18/567,759

(22) PCT Filed: Jun. 1, 2022

(86) PCT No.: PCT/EP2022/064880  
§ 371 (c)(1),  
(2) Date: Dec. 6, 2023

(87) PCT Pub. No.: WO2022/258452  
PCT Pub. Date: Dec. 15, 2022

(65) Prior Publication Data  
US 2024/0270041 A1 Aug. 15, 2024

(30) Foreign Application Priority Data  
Jun. 8, 2021 (EP) .................................... 21178155

(51) Int. Cl.  
*B60G 17/04* (2006.01)  
*G07C 5/08* (2006.01)

(52) U.S. Cl.  
CPC ....... *B60G 17/0408* (2013.01); *G07C 5/0816* (2013.01); *B60G 2300/50* (2013.01);  
(Continued)

(58) Field of Classification Search  
CPC ............ B60G 17/0408; B60G 2300/50; B60G 2400/51; B60G 2400/84; B60G 2500/205; B60G 2600/1871; G07C 5/0816  
See application file for complete search history.

(56) References Cited

U.S. PATENT DOCUMENTS 5,633,800 A * 5/1997 Bankert ................... G07C 3/00  
706/920  
5,911,127 A * 6/1999 Tulpule .............. G05B 23/0254  
702/196

(Continued)

FOREIGN PATENT DOCUMENTS

DE 102019104756 9/2019

OTHER PUBLICATIONS

International Search Report and Written Opinion issued in International PCT Application No. PCT/EP2022/064880, dated Jun. 1, 2022, in 17 pages.

*Primary Examiner* — Kurt Philip Liethen  
(74) *Attorney, Agent, or Firm* — JCIPRNET

(57) ABSTRACT

The present disclosure relates to a method for avoiding overheating of a vehicle subsystem, which comprises a compressor with a pressure chamber. The method comprises the steps of executing an Extended Kalman Filter on a control module that calculates an error between a predicted state model of the vehicle subsystem and a corresponding measured state model of the vehicle subsystem, and processes the calculated error to adjust the predicted state model, including adjusting the estimated ambient pressure, based on weighted uncertainties of the measured and estimated parameters. The method further comprises the steps of comparing the estimated ambient pressure to a predetermined ambient pressure default value; and reducing a cut-off pressure target value of the vehicle subsystem by a reduction (Continued)

amount for a period of time, when the estimated ambient pressure is less than or equal to the predetermined ambient pressure default value.

12 Claims, 3 Drawing Sheets

(52) U.S. Cl.
    CPC ...... *B60G 2400/51* (2013.01); *B60G 2400/84* (2013.01); *B60G 2500/205* (2013.01); *B60G 2600/1871* (2013.01)

(56) References Cited

U.S. PATENT DOCUMENTS

| | | | |
|---|---|---|---|
| 6,266,590 B1 | 7/2001 | Kutscher et al. | |
| 6,874,772 B2* | 4/2005 | Oldenettel | B60G 17/0523 |
| | | | 280/124.16 |
| 8,761,999 B2* | 6/2014 | Ilias | B60G 17/0523 |
| | | | 180/41 |
| 11,569,517 B2* | 1/2023 | Song | H01M 8/04313 |
| 12,130,594 B2* | 10/2024 | Weissenmayer | G05B 13/0215 |
| 2007/0179763 A1* | 8/2007 | Perchanok | F02D 41/0007 |
| | | | 703/7 |
| 2020/0312056 A1* | 10/2020 | Wang | G06N 20/10 |
| 2022/0043403 A1* | 2/2022 | Weissenmayer | G06F 17/18 |

* cited by examiner

METHOD AND SYSTEM FOR AVOIDING OVERHEATING OF A VEHICLE SUBSYSTEM

CROSS-REFERENCE TO RELATED APPLICATIONS

This application is the U.S. National Phase under 35 U.S.C. § 371 of International Application No. PCT/EP2022/064880, filed Jun. 1, 2022, titled METHOD AND SYSTEM FOR AVOIDING OVERHEATING OF A VEHICLE SUBSYSTEM, which claims priority to EP Application No. 21178155.4, filed Jun. 8, 2021, the entirety of each of which is hereby expressly incorporated by reference herein.

BACKGROUND

Field

The present invention relates to a method and a system for avoiding overheating of a vehicle subsystem that comprises a compressor and a pressure chamber. In particular, the present invention relates to a method and a system implemented or implementable in an electric vehicle. Preferably, the method and system of the invention are relate to the technical field of air sus-pension applications.

Description of Related Art

In motor vehicles and trucks compressors are provided to build up pressure within vehicle or truck subsystems and to provide the pressure to connected subsystems, such as to air suspension systems. In conventional systems known from practice, the compressor is switched-off when a predefined target cut-off pressure inside the compressor's pressure chamber is reached and detected.

However, in practice there is a risk that in cases in which the vehicle travels in areas with low ambient pressure, i.e. at high altitudes, the compressors will no longer be able to produce the set target cut-off pressure due to the low ambient pressure. This could lead to severe overheating and damage of vehicle subsystem components.

In order to reduce the risk of overheating, there are prior art systems comprising an ambient pressure sensor that monitors ambient pressure. If the ambient pressure detected by the ambient pressure sensor falls below a predefined threshold, the cut-off pressure is reduced to avoid overheating. Such a system is are known from practice.

However, providing an ambient pressure sensor for measuring ambient pressure involves respective costs. Moreover, the additional pressure sensor constitutes an additional component that can be subject to possible damage. In this case, reliable function of the overall system is potentially jeopardized.

Moreover, in some cases it can be difficult and complex to implement sensor data from an ambient pressure sensor as input data for other vehicle components, especially when the components are provided by different suppliers. In other words, in some cases there is an insufficient sensor data exchange among system components.

Document EP 1 744 915 A1 discloses a method for controlling an air volume in a closed air supply installation without ambient pressure measurement.

It is an object of the present invention to provide a method and a system for avoiding overheating of a vehicle subsystem, which overcome at least some of the disadvantages of the prior art.

In particular, it is an object of the present invention to provide a method and a system that increases functional safety of the overall system.

In particular, it is an object of the present invention to provide a method and a system for avoiding overheating of a vehicle subsystem, which enable cost reduction.

Preferably, it is an object of the present invention to provide a method and a system for avoiding overheating of a vehicle subsystem, the method and system being simply implementable in an electric vehicle.

These objects are achieved by the subject matter of the independent claims. Preferred embodiments and preferred features are specified in the dependent claims and the following description.

SUMMARY

According to an aspect, the invention relates to a method for avoiding overheating of a vehicle subsystem, wherein the vehicle subsystem comprises a compressor with a pressure chamber. In other word, the invention relates to a method for controlling a vehicle subsystem so that overheating is avoided. In particular, the present invention relates to a method for avoiding overheating of a vehicle subsystem by determining and continuously approximating an estimated ambient pressure without measuring the ambient pressure, i.e. without using any (ambient) pressure sensor. Hence, an additional ambient pressure sensor can be omitted, which reduces the costs of the corresponding system.

The method comprises the step of executing an Extended Kalman Filter (EKF) on a control module. Extended Kalman Filtering is suitable for covering non-linearities and thus differs from conventional Kalman Filters, so-called linear quadratic estimation (LQE).

The Extended Kalman Filter, i.e. the control module, calculates an error between a predicted state model of the vehicle subsystem, more precisely of the compressor, and a corresponding measured state model of the vehicle subsystem, more precisely of the compressor. A corresponding measured state model can mean that one predicted state model is assigned to one measured state model. More precisely, one predicted state model estimated for a certain point in time can be provided for and assigned to one measured state model for the same point in time.

The predicted state model comprises as parameters at least, in specific optional embodiments only, an estimated pressure (value) inside the pressure chamber, an estimated ambient pressure (value), an estimated rotational speed (value) of the compressor and an estimated fluid volume stream (value) of the compressor. Additional parameters in relation to these parameters can further improve the quality and accuracy of the filter.

Estimated as used herein can mean that the respective parameter is not measured, i.e. constitutes a non-measured parameter. Ambient pressure relates to an ambient pressure of the subsystem, in which the subsystem is operated.

The measured state model comprises as parameters at least, preferably only, a measured pressure (value) inside the pressure chamber, a measured rotational speed (value) of the compressor and a measured fluid volume stream (value) of the compressor. Preferably, the measured pressure can be measured by a pressure chamber pressure sensor, which can be part of the subsystem or can be part of an external system. Preferably, the measured rotational speed can be measured by a compressor rotational velocity sensor, which can be part of the subsystem or can be part of an external system. Preferably, the measured fluid volume stream can be measured by a volume flow sensor, which can be part of the subsystem or can be part of an external system.

During operation, compressors are usually operated at a constant rotational speed, namely at a maximum compressor rotational speed. Hence, the measured and estimated rotational speed used herein can in particular relate to this maximum compressor rotational speed. Consequently, the measured and estimated fluid volume stream can in particular relate to the fluid volume stream at this maximum rotational speed, which depends on the ambient pressure.

The Extended Kalman Filter, i.e. the control module, further processes the calculated error to adjust or correct the predicted state model, including adjusting the estimated ambient pressure, dependent on weighted uncertainties of the measured and estimated parameters of the predicted state model and the measured state model. Adjusting the estimated ambient pressure can also be described as updating and approximating the estimated ambient pressure towards an actual (real) ambient pressure value. In other words, the Extended Kalman Filter calculates the errors between the models predicted state and measured state. These errors are then processed to correct the individual states. The weights of the corrections depend on the uncertainty of the measurements and the prediction. This ensures that even values that are not measured increase in accuracy over time.

The Extended Kalman Filter can repeat the calculating and processing so that a plurality of predicted state models of the vehicle subsystem and a plurality of corresponding measured state models of the vehicle subsystem are used for determining or continuously approximating the estimated (Non-measured) ambient pressure.

The method comprises the step of comparing the estimated ambient pressure to a predetermined ambient pressure default value. The predetermined ambient pressure default value can be 1 bar. In particular, the comparison can be performed within a few seconds of system initialization. In other words, the Extended Kalman Filter can run for a few seconds before the com-parison is performed, preferably between 1 and 10 seconds, more preferably between 2 and 7 seconds, still more preferably less than 5 seconds.

The method comprises the step of reducing a cut-off pressure target value of the vehicle sub-system by a reduction amount for a specific period of time, when the estimated ambient pressure is less than or equal to the predetermined ambient pressure default value. The actual value of the target pressure and reduction amount can strongly depend on the actual overall system, in particular on characteristics of the corresponding compressor.

The period of time during which the cut-off pressure target value is reduced can depend on the estimated ambient pressure. If it rises above a predetermined ambient pressure resumption value, the reduced cut-off pressure target value can be set back to the original cut-off pressure target value. Leakage losses can be used for determining the ambient pressure and setting the period of time. In case the compressor does not operate after reducing the cut-off pressure target value (and thus an ambient pressure estimation is not possible), the cut-off target pressure can be increased step-wise according to predefined steps and predefined time intervals. Thus, it can be guaranteed that ambient pressure estimation can effectively be performed, i.e. the EKF can be switched-on again.

In particular, the estimated pressure (value) inside the pressure chamber can be based on the following calculation, which represents a mathematical model of a compressor:

$$\acute{p} = p + p_{amb} \cdot f(\dot{V}, n, dt),$$

wherein $\acute{p}$ constitutes the estimated pressure inside the pressure chamber, p constitutes a previously estimated pressure inside the pressure chamber (i.e. estimated for a preceding point in time), $p_{amb}$ constitutes the estimated ambient pressure, $\dot{V}$ constitutes the fluid volume stream (at ambient pressure), n constitutes the compressor's rotational speed, and dt constitutes a time interval. The function f depends on the type of compressor, which can for example be an ideal displacement compressor or an ideal flow compressor. Function f results from the technical characteristics of the corresponding compressor. It is derivable by a curve fit with regard to the individual compressor characteristic curve.

By means of the present invention, the ambient pressure in which the compressor is to operate without the presence of an ambient pressure sensor can be predicted by an Extended Kalman Filter with sufficient accuracy to prevent overheating in applications with low ambient pressure by reducing the target cut-off pressure. Thus, functional safety of the overall system can be increased. Functional safety can be further increased as safety precautions and/or a warning output for the driver can be implemented based on the predicted ambient pressure.

In an embodiment, the weighted uncertainties of the measured parameters can be incorporated in the adjusting of the predicted state model in form of a measurement covariance matrix of the Extended Kalman Filter, the measurement covariance matrix including a variance of pressure chamber pressure sensor data, a variance of compressor rotational velocity sensor data, and variance of volume flow sensor data. Values of these variances depend on and are derivable from the technical characteristics (sensor data sheet) of the corresponding sensor.

In an embodiment, the weighted uncertainties of the estimated parameters can be incorporated in the adjusting of the predicted state model in form of a process covariance matrix of the Extended Kalman Filter, the process covariance matrix including at least one variable that represents an uncertainty about the pressure in the pressure chamber.

The vehicle subsystem can be configured to be switchable between an open state in which the subsystem is open towards a connected further subsystem and a closed state in which the subsystem is closed towards the connected further subsystem. In the sense of the invention, the further subsystem can be another vehicle subsystem or can be the environment.

The process covariance matrix of the Extended Kalman Filter can be temporarily dynamically changed, when the vehicle subsystem switches from the closed state to the open state. More precisely, the value of the at least one variable that represents an uncertainty about the pressure in the pressure chamber is multiplied when the vehicle subsystem switches from the closed state to the open state. In particular, the value of the at least one variable that represents an uncertainty about the pressure in the pressure chamber can be increased between tenfold and a hundredfold, preferably between twentyfold and eightyfold, more preferably between thirtyfold and seventyfold, still more preferably between fortyfold and sixtyfold, even more preferably fiftyfold. For example, the at least one variable that represents an uncertainty about the pressure in the pressure chamber can be increased from 2 to 100. Providing a variable in the process covariance matrix and multiplying the variable takes account of the increased uncertainties of the predicted state vector due to switching the state of the vehicle subsystem from closed to open. In particular, the vehicle subsystem can switch from a closed state to an open state when the valve connecting the vehicle subsystem with the further subsystem opens, whereby the pressure chamber is opened towards the further subsystem. The process covariance matrix of the Extended Kalman Filter can be dynamically changed for the period during which the system is open. Usually, the pressure compensation, during which the system is open, takes only a few seconds.

In an embodiment, the method can further comprise a step of generating a warning signal for warning a driver of the vehicle, when the estimated ambient pressure is less than or equal to the predetermined ambient pressure default value. Hence, the method can comprise the step of sending or providing the warning system to the driver. For example, the driver can be warned that a desired "ride height", or a desired setting of an air suspension system, can no longer be adjusted as quickly as the driver is used to from driving at higher ambient pressures. This increases functional safety of the overall system.

In an embodiment, the method can further comprise the steps of comparing the measured pressure inside the pressure chamber with the cut-off pressure target value, either with the reduced or with the non-reduced cut-off pressure target value, and switching-off the compressor for a period of time, when the measured pressure inside the pressure chamber reaches or rises above the cut-off pressure target value. In particular, the compressor can be switched-off until the measured pressure falls below the cut-off pressure target value again. The measured pressure can "fall" below the cut-off pressure target value again, when the cut-off pressure value is increased from the reduced cut-off pressure target value to the initial cut-off pressure target value again (in conjunction with rise of the ambient pressure above the predetermined ambient pressure default value). The step of comparing the measured pressure inside the pressure chamber with the cut-off pressure target value can be carried out repeatedly and/or continuously.

In an embodiment, the vehicle can be an electric vehicle. Unlike conventional combustion engine vehicles, electric vehicles are often not provided with an ambient pressure sensor that could be used for supplying measurement values to the compressor subsystem.

In an embodiment, the further subsystem can be an air suspension system which is connected to the vehicle subsystem by a controllable valve.

For the Extended Kalman Filter the following design can be used:

$$x = \begin{pmatrix} p_{amb} \\ p \\ n \\ \dot{V} \end{pmatrix}$$

wherein x constitutes the state vector, p constitutes a previously estimated pressure inside the pressure chamber (i.e. estimated for a preceding point in time), $p_{amb}$ constitutes the estimated ambient pressure, $\dot{V}$ constitutes the fluid volume stream (at ambient pressure), n constitutes the compressor's rotational speed;

$$\dot{x} = \begin{pmatrix} p_{amb} \\ p + p_{amb} \cdot f(\dot{V}, n, dt) \\ n \\ \dot{V} \end{pmatrix}$$

wherein $\dot{x}$ constitutes the state vector, p constitutes a previously estimated pressure inside the pressure chamber (i.e. estimated for a preceding point in time), $p_{amb}$ constitutes the estimated ambient pressure, $\dot{V}$ constitutes the fluid volume stream (at ambient pressure), n constitutes the compressor's rotational speed; with $$\dot{P} = F_J P F_J^T + Q$$

wherein P constitutes the state covariance matrix, $\dot{P}$ constitutes the predicted state covariance matrix, $F_j$ constitutes the Jacobian matrix derived from the predicted state vector, and Q constitutes the process covariance matrix; with $$Q = \begin{pmatrix} \sim 0.1 & 0 & 0 & 0 \\ \sim 2 & i & 0 & 0 \\ 0 & 0 & \sim 10^4 & 0 \\ 0 & 0 & 0 & \sim 10^4 \end{pmatrix}$$

with i being a variable that represents an uncertainty about the pressure in the pressure chamber, wherein i can be initialized at about 2 and can be increased to about 100 when the valve of the pressure chamber is opened, since in that case the compressor model formula is not valid anymore in this operating stage.

For the measurement update and approximation of the estimated ambient pressure, the following design can be used for the Extended Kalman Filter:

$$y = z - H\dot{x}$$

with y constituting the delta between measurement and prediction in measurement coordinates, z constitutes the vector of system sensor measurements $$\begin{pmatrix} p \\ n \\ \dot{V} \end{pmatrix}.$$

and H constitutes the measurement matrix, with $$H = \begin{pmatrix} 0 & 1 & 0 & 0 \\ 0 & 0 & 1 & 0 \\ 0 & 0 & 0 & 1 \end{pmatrix}$$

and with $$S = H\dot{P}H^T + R$$

and

-continued $$R = \begin{pmatrix} \sigma_p^2 & 0 & 0 \\ 0 & \sigma_n^2 & 0 \\ 0 & 0 & \sigma_V^2 \end{pmatrix}$$

wherein S constitutes the innovation covariance matrix, R constitutes the measurement covariance matrix, with $\sigma_p^2$ constituting the variance of pressure chamber pressure sensor data (sensor parameter), $\sigma_n^2$ constituting the variance of compressors rotational velocity sensor data (sensor parameter), and $\sigma_V^2$ constituting the variance of volume flow sensor data (sensor parameter); with $$K = P'H^T S^{-1}$$
$$x = x' + Ky$$

and $$P = (I - KH)P',$$

wherein I constitutes the identity matrix and P constitutes the state covariance matrix that is an output of the EKF used for validation of the system.

The Extended Kalman Filter can calculate the errors between the models predicted state and measured state. These errors can then be processed to correct the individual states. The weights of the corrections depend on the uncertainty of the measurements (R) and the prediction (Q). Thus, even predicted (estimated) values can be increased in accuracy over time.

Another aspect of the invention relates to a control module for controlling a vehicle subsystem, wherein the vehicle subsystem comprises a compressor with a pressure chamber. The control module is configured to carry out a method as described above.

Another aspect of the invention relates to a system for a vehicle, in particular for an electric vehicle. The system comprises a vehicle subsystem having a compressor with a pressure chamber. The system further comprises a control module with an Extended Kalman Filter implemented thereon.

The Extended Kalman Filter is configured to calculate an error between a predicted state model of the vehicle subsystem and a corresponding measured state model of the vehicle subsystem.

The predicted state model comprises as parameters an estimated pressure inside the pressure chamber, an estimated ambient pressure, an estimated rotational speed of the compressor and an estimated fluid volume stream of the compressor.

The measured state model comprising as parameters a measured pressure inside the pressure chamber, a measured rotational speed of the compressor and a measured fluid volume stream of the compressor.

The Extended Kalman Filter is configured to process the calculated error to adjust the predicted state model, including adjusting the estimated ambient pressure, based on weighted uncertainties of the measured and estimated parameters.

The control module further comprises a comparing unit configured to compare the estimated ambient pressure to a predetermined ambient pressure default value.

The control module further comprises a cut-off pressure setting unit configured to reduce a cut-off pressure target value of the vehicle subsystem by a reduction amount for a period of time, when the estimated ambient pressure is less than or equal to the predetermined ambient pressure default value.

In an embodiment, the system can comprise a further subsystem, in particular in form of an air suspension system. The further subsystem is connected to the vehicle subsystem by a controllable valve, wherein the system is configured to supply pressure from the pressure chamber of the compressor to the further subsystem upon opening of the controllable valve.

In an embodiment, the system can further comprise a pressure chamber pressure sensor configured to measure the pressure inside the pressure chamber, a compressor rotational velocity sensor configured to measure the rotational speed of the compressor, and/or a volume flow sensor configured to measure the fluid volume stream of the compressor.

Even though some of the features, functions, embodiments, technical effects and advantages have been described with regard to one aspect, it will be understood that these features, functions, embodiments, technical effects and advantages can be combined with one another also applying to other embodiments and aspects. In particular, features, functions, embodiments, technical effects and advantages that have been described in the context of the method can also apply for the system and vice versa.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE DRAWINGS

Various examples of embodiments of the present invention will be explained in more detail by virtue of the following embodiments illustrated in the figures and/or described below.

Figure 1:
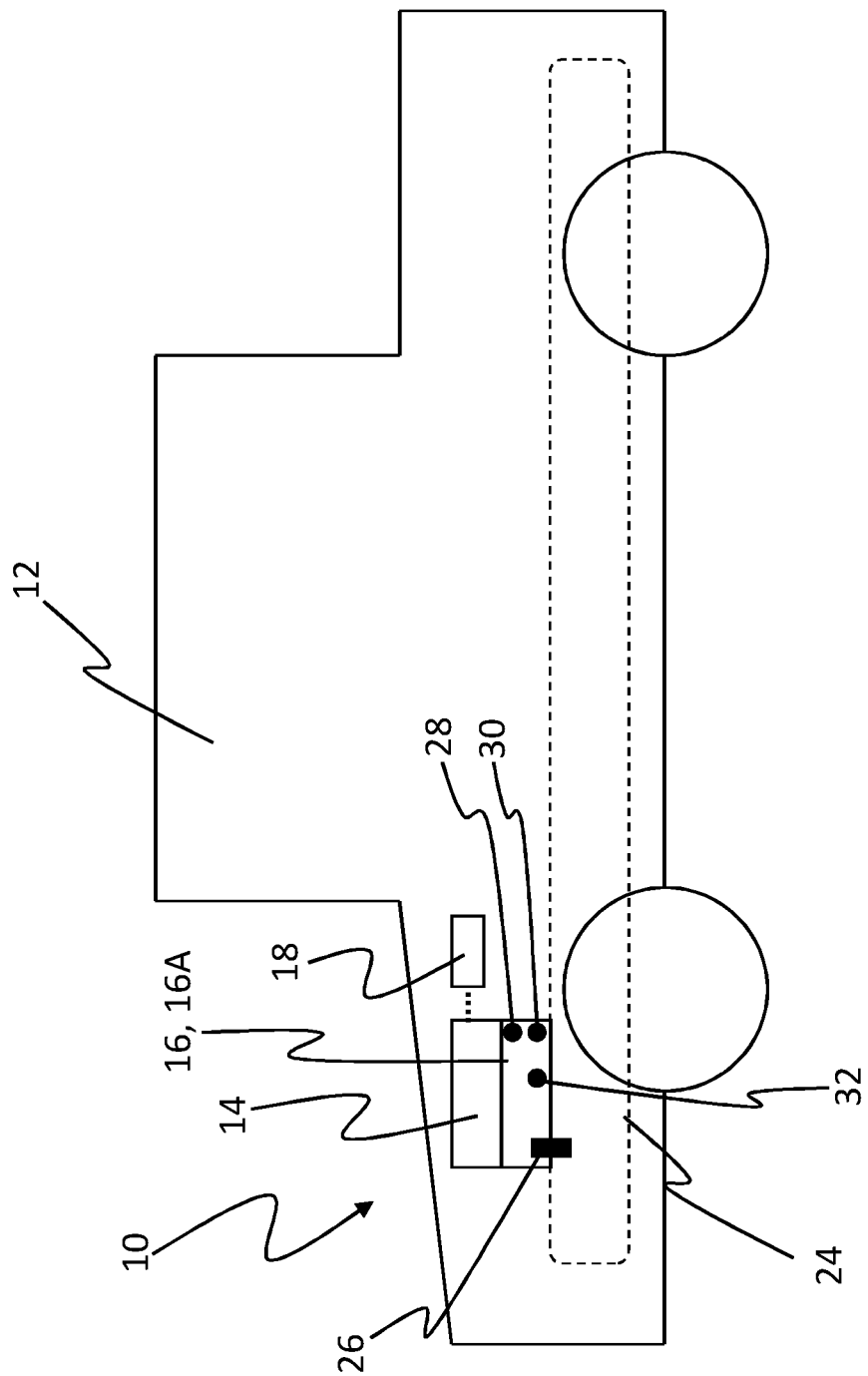
FIG. 1 shows a schematic perspective view of a vehicle comprising a system according to the invention.

FIG. 1 shows a system 10 according to the invention that is implemented in a vehicle 12 in or-der to avoid overheating of a subsystem 14.

The system 10 comprises the vehicle subsystem 14 having a compressor 16 with a pressure chamber 16A and having a control module 18 operationally connected therewith. An Extended Kalman Filter (EKF) is implemented on the control module 18. The EKF is configured to calculate an error between a predicted state model of the vehicle subsystem 14 and a corresponding measured state model of the vehicle subsystem 14.

The predicted state model comprises as parameters an estimated pressure inside the pressure chamber 16A, an estimated ambient pressure, an estimated rotational speed of the compressor 16 and an estimated fluid volume stream of the compressor 16. The measured state model comprises as parameters a measured pressure inside the pressure chamber 16A, a measured rotational speed of the compressor 16 and a measured fluid volume stream of the compressor 16.

The EKF is further configured to process the calculated error to adjust the predicted state model, including adjusting the estimated ambient pressure, based on weighted uncertainties of the measured and estimated parameters.

Figure 2:
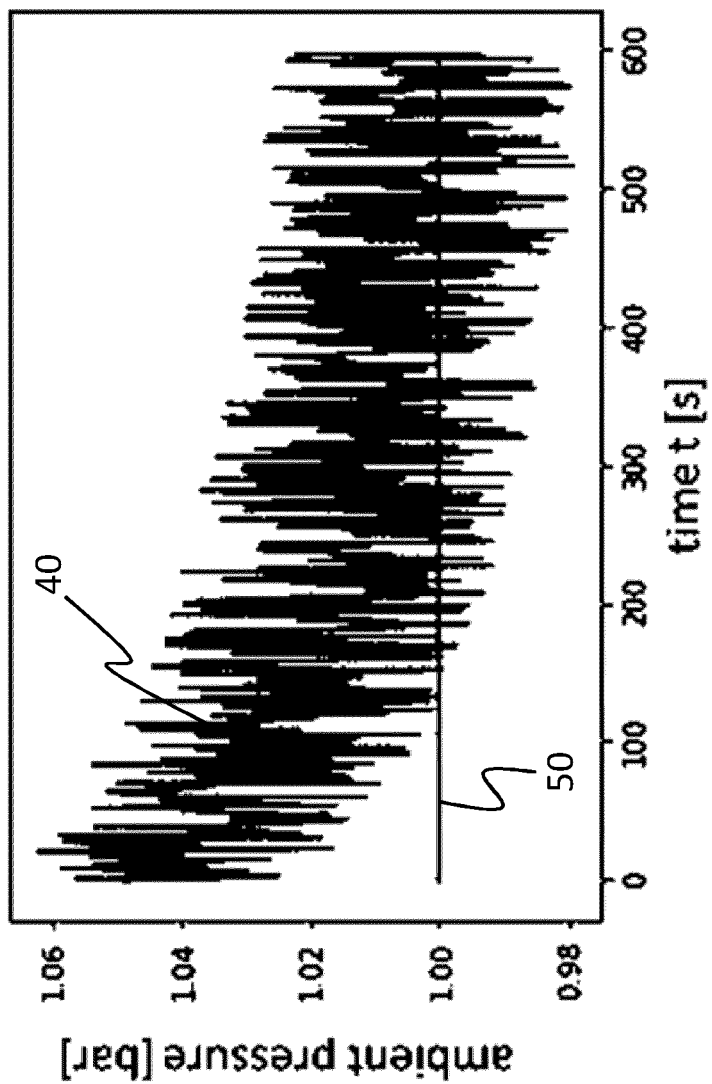
FIG. 2 shows a schematic detailed view of the control module of FIG. 1.

More precisely, in this example, when the vehicle is turned on without knowledge of the ambient pressure the method will initially estimate the ambient pressure to be 1.05 bar. This leads to an error after the prediction by the EKF that expects the ambient pressure as an input value. This error is then processed with the state vector depending on the specified uncertainties. Since the standard deviation of the measured signals is relatively low, the error is compensated by reducing the estimated ambient pressure 40 continuously. Thus the estimated ambient pressure 40 is corrected over time. This approximation of the actual ambient pressure 50 by the estimated ambient pressure 40 over time is shown in the diagram of FIG. 2.

As shown in FIG. 1, the compressor 16 is provided with various sensors for measuring the parameters of the measured state model. Namely, the compressor 16 is provided with a pressure chamber pressure sensor 28 configured to measure the pressure inside the pressure chamber 16A, a compressor rotational velocity sensor 30 configured to measure the rotational speed of the compressor 16, and a volume flow sensor 32 configured to measure the fluid volume stream of the compressor 16.

Figure 3:
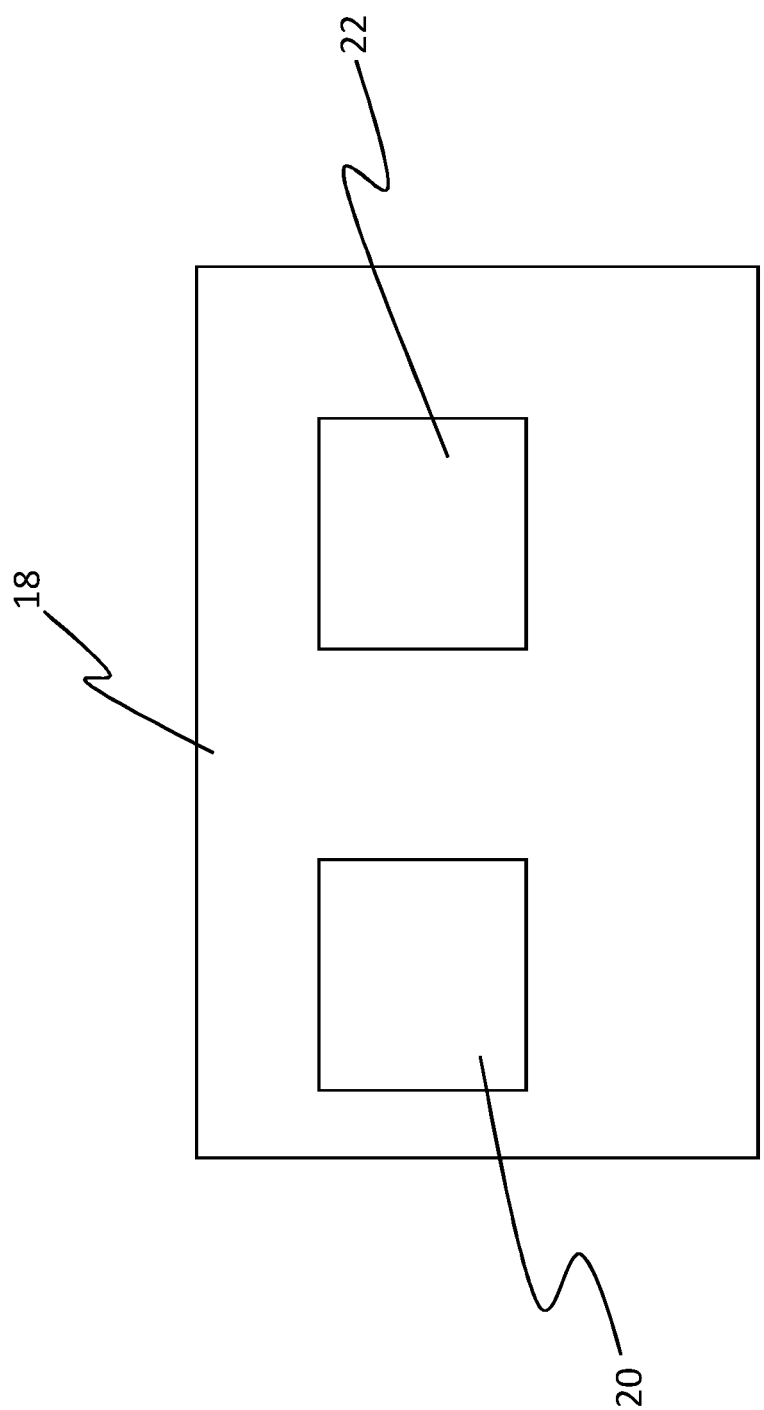
FIG. 3 shows a schematic diagram of an ambient pressure estimation by a method according to the invention.

As shown in FIG. 3, the control module 18 comprises a comparing unit 20 and a cut-off pressure setting unit 22. The comparing unit 20 is configured to compare the estimated ambient pressure 40 to a predetermined ambient pressure default value, which can for example be 1 bar. The cut-off pressure setting unit 22 is configured to reduce a cut-off pressure target value of the vehicle subsystem 14 by a reduction amount for a period of time, when the estimated ambient pressure is less than or equal to the predetermined ambient pressure default value. In this example, the cut-off pressure target value can be 17 bar. The cut-off pressure target value can be reduced by a reduction amount of 3 bar to a reduced amount of 14 bar.

Subsequently, the compressor 16 is switched-off for a period of time, when the measured pressure inside the pressure chamber 16A reaches or rises above the cut-off pressure target value, i.e. above 14 bar in the reduced state. The compressor 16 is switched-off until the measured pressure falls below the cut-off pressure target value again.

This principle can reduce an error in the estimated ambient pressure state when the vehicle 12 drives into areas of higher altitude for a longer period of time. Since this change of state happens relatively slowly, the EKF has enough time to adjust the predictions and provide exact estimations on the ambient pressure. When the estimated ambient pressure reaches a certain predefined minimum, the compressor's cut-off pressure is temporarily reduced to avoid overheating.

As can be seen in FIG. 1, the system 10 comprises a further subsystem 24 in form of an air suspension system. The further subsystem 24 is connected to the vehicle subsystem 14 by a controllable valve 26. The system 10 is configured to supply pressure from the pressure chamber 16A of the compressor 16 to the further subsystem 24 upon opening of the controllable valve 26.

Thus, by means of the present invention, even when there is no knowledge of the ambient pressure available, the ambient pressures estimation accuracy increases over time.

What is claimed is:

1. A method for controlling a vehicle subsystem, the vehicle subsystem comprising a compressor with a pressure chamber, wherein the compressor is provided with a pressure chamber pressure sensor configured to measure a pressure inside the pressure chamber, a compressor rotational velocity sensor configured to measure a rotational speed of the compressor, and a volume flow sensor configured to measure a fluid volume stream of the compressor; wherein the vehicle subsystem is switchable between an open state in which the subsystem is open towards a connected further subsystem and a closed state in which the subsystem is closed towards the connected further subsystem;

wherein the method comprises the steps of:

acquiring a measured pressure inside the pressure chamber through the pressure chamber pressure sensor, a measured rotational speed of the compressor through the compressor rotational velocity sensor, and a measured fluid volume stream of the compressor through the volume flow sensor;

executing an Extended Kalman Filter on a control module that calculates an error between a predicted state model of the vehicle subsystem and a corresponding measured state model of the vehicle subsystem, the predicted state model comprising as parameters an estimated pressure inside the pressure chamber, an estimated ambient pressure, an estimated rotational speed of the compressor and an estimated fluid volume stream of the compressor, and the measured state model comprising as parameters the measured pressure inside the pressure chamber, the measured rotational speed of the compressor and the measured fluid volume stream of the compressor, and processes the calculated error to adjust the predicted state model, including adjusting the estimated ambient pressure, based on weighted uncertainties of the measured and estimated parameters;

comparing the estimated ambient pressure to a predetermined ambient pressure default value;

reducing a cut-off pressure target value of the vehicle subsystem by a reduction amount for a period of time, when the estimated ambient pressure is less than or equal to the predetermined ambient pressure default value;

comparing the measured pressure inside the pressure chamber with the cut-off pressure target value; and switching-off the compressor for a period of time, when the measured pressure inside the pressure chamber reaches or rises above the cut-off pressure target value.

2. The method according to claim 1, wherein the weighted uncertainties of the measured parameters are incorporated in the adjusting in form of a measurement covariance matrix including a variance of pressure chamber pressure sensor data, a variance of compressor rotational velocity sensor data, and variance of volume flow sensor data.

3. The method according to claim 1, wherein the weighted uncertainties of the estimated parameters are incorporated in the adjusting in form of a process covariance matrix including at least one variable that represents an uncertainty about the pressure in the pressure chamber.

4. The method according to claim 1, wherein the process covariance matrix of the Extended Kalman Filter is temporarily dynamically changed, when the vehicle subsystem switches from the closed state to the open state.

5. The method according to claim 1, further comprising the step of generating a warning signal for warning a driver of the vehicle, when the estimated ambient pressure is less than or equal to the predetermined ambient pressure default value.

6. The method according to claim 1, wherein the vehicle is an electric vehicle.

7. The method according to claim 1, wherein the further subsystem is an air suspension system which is connected to the vehicle subsystem by a controllable valve.

8. A control module configured to perform the method according to claim 1, the vehicle subsystem comprising the compressor with the pressure chamber.

9. A system for an electric vehicle, comprising:
a vehicle subsystem having a compressor with a pressure chamber, wherein the compressor is provided with a pressure chamber pressure sensor configured to measure a pressure inside the pressure chamber, a compressor rotational velocity sensor configured to measure a rotational speed of the compressor, and a volume flow sensor configured to measure a fluid volume stream of the compressor; wherein the vehicle subsystem is switchable between an open state in which the subsystem is open towards a connected further subsystem and a closed state in which the subsystem is closed towards the connected further subsystem; and
a control module with an Extended Kalman Filter implemented thereon, which is configured to acquire a measured pressure inside the pressure chamber through the pressure chamber pressure sensor, a measured rotational speed of the compressor through the compressor rotational velocity sensor, and a measured fluid volume stream of the compressor through the volume flow sensor; which is configured to calculate an error between a predicted state model of the vehicle subsystem and a corresponding measured state model of the vehicle subsystem, the predicted state model comprising as parameters an estimated pressure inside the pressure chamber, an estimated ambient pressure, an estimated rotational speed of the compressor and an estimated fluid volume stream of the compressor, and the measured state model comprising as parameters the measured pressure inside the pressure chamber, the measured rotational speed of the compressor and the measured fluid volume stream of the compressor, and which is configured to process the calculated error to adjust the predicted state model, including adjusting the estimated ambient pressure, based on weighted uncertainties of the measured and estimated parameters,
wherein the control module comprises a comparing unit configured to compare the estimated ambient pressure to a predetermined ambient pressure default value, and
wherein the control module comprises a cut-off pressure setting unit configured to reduce a cut-off pressure target value of the vehicle subsystem by a reduction amount for a period of time, when the estimated ambient pressure is less than or equal to the predetermined ambient pressure default value;
wherein the control module is configured to compare the measured pressure inside the pressure chamber with the cut-off pressure target value, and switch-off the compressor for a period of time, when the measured pressure inside the pressure chamber reaches or rises above the cut-off pressure target value.

10. The system according to claim 9, comprising the further subsystem connected to the vehicle subsystem by a controllable valve, wherein the system is configured to supply pressure from the pressure chamber of the compressor to the further subsystem upon opening of the controllable valve.

11. The method according to claim 4, wherein the value of the at least one variable is multiplied when the vehicle subsystem switches from the closed state to the open state.

12. The system according to claim 10, wherein the further subsystem comprises an air suspension system.

* * * * *